US008533022B2

(12) United States Patent
Krishnan Nair (10) Patent No.: US 8,533,022 B2
(45) Date of Patent: Sep. 10, 2013

(54) ENTERPRISE WIDE VALUE CHAIN MANAGEMENT SYSTEM (EVCM) FOR TRACKING, ANALYZING AND IMPROVING ORGANIZATIONAL VALUE CHAIN PERFORMANCE AND DISRUPTIONS UTILIZING CORRECTIVE ACTIONS

(76) Inventor: Nandakumar Krishnan Nair, Trivandrum (IN)

( * ) Notice: Subject to any disclaimer, the term of this patent is extended or adjusted under 35 U.S.C. 154(b) by 62 days.

(21) Appl. No.: 13/231,932

(22) Filed: Sep. 13, 2011

(65) Prior Publication Data

US 2013/0066670 A1    Mar. 14, 2013

(51) Int. Cl.
*G06Q 10/00*    (2012.01)

(52) U.S. Cl.
USPC ........................................ 705/7.23; 705/7.11

(58) Field of Classification Search
USPC ........................................................ 705/7.23
See application file for complete search history.

(56) References Cited

U.S. PATENT DOCUMENTS

| | | | | |
|---|---|---|---|---|
| 5,870,545 | A * | 2/1999 | Davis et al. | 709/201 |
| 5,978,911 | A * | 11/1999 | Knox et al. | 713/1 |
| 6,332,163 | B1 * | 12/2001 | Bowman-Amuah | 709/231 |
| 6,345,239 | B1 * | 2/2002 | Bowman-Amuah | 703/6 |
| 6,427,132 | B1 * | 7/2002 | Bowman-Amuah | 703/22 |
| 6,477,665 | B1 * | 11/2002 | Bowman-Amuah | 714/39 |
| 6,640,244 | B1 * | 10/2003 | Bowman-Amuah | 709/207 |
| 6,735,716 | B1 * | 5/2004 | Podanoffsky | 714/10 |
| 6,918,053 | B1 * | 7/2005 | Thatte et al. | 714/16 |
| 6,961,865 | B1 * | 11/2005 | Ganesh et al. | 714/2 |
| 7,194,445 | B2 * | 3/2007 | Chan et al. | 706/20 |
| 7,289,964 | B1 * | 10/2007 | Bowman-Amuah | 705/1.1 |
| 7,296,192 | B2 * | 11/2007 | Breitling et al. | 714/49 |
| 7,299,202 | B2 * | 11/2007 | Swanson | 705/26.5 |
| 7,346,529 | B2 * | 3/2008 | Flores | 705/7.36 |
| 7,370,244 | B2 * | 5/2008 | Breitling et al. | 714/49 |
| 7,379,846 | B1 * | 5/2008 | Williams et al. | 702/185 |
| 7,523,092 | B2 * | 4/2009 | Andreev et al. | 1/1 |
| 7,584,165 | B2 * | 9/2009 | Buchan | 706/60 |
| 7,596,507 | B2 * | 9/2009 | Gibson | 705/7.27 |
| 7,698,167 | B2 * | 4/2010 | Batham et al. | 705/26.62 |
| 7,836,357 | B2 * | 11/2010 | Fischer et al. | 714/48 |
| 7,856,406 | B2 * | 12/2010 | Leventhal | 705/77 |
| 7,962,472 | B2 * | 6/2011 | Erickson et al. | 707/713 |
| 8,010,396 | B2 * | 8/2011 | Gura | 705/7.12 |

(Continued)

FOREIGN PATENT DOCUMENTS

WO    WO 02/102097 A1 * 12/2002
WO    WO 2007/072501 A2 * 6/2007

OTHER PUBLICATIONS

Butner, Karen et al., Sense-and-respond supply chains: enabling breakthrough strategy IBM Global Business Services, Aug. 2004.*

(Continued)

*Primary Examiner* — Scott L Jarrett
(74) *Attorney, Agent, or Firm* — Barry Choobin; Patent360 LLC (57)    ABSTRACT

An Enterprise-wide Value chain management (EVCM) system for real-time monitoring and control of enterprise-wide value generation and consumption is disclosed. The EVCM system comprising, an interface unit to interact with pluralities of entities in an organization to track and collect event records, compute value generation or consumption, measure the value and aggregate it at various levels of enterprise, make it available though dashboard to provide cockpit view of the enterprise value, provide control system, both internal and external, for influencing the value dynamics across the enterprise.

42 Claims, 2 Drawing Sheets

(56) References Cited

U.S. PATENT DOCUMENTS

| | | | |
|---|---|---|---|
| 8,032,409 B1* | 10/2011 | Mikurak | 705/14.39 |
| 8,082,471 B2* | 12/2011 | Khan | 714/38.1 |
| 8,095,416 B2* | 1/2012 | Harvey et al. | 705/7.39 |
| 8,266,123 B2* | 9/2012 | Dill et al. | 707/702 |
| 2002/0065885 A1* | 5/2002 | Buonanno et al. | 709/205 |
| 2003/0105654 A1* | 6/2003 | MacLeod et al. | 705/7 |
| 2005/0091156 A1* | 4/2005 | Hailwood et al. | 705/40 |
| 2005/0216228 A1* | 9/2005 | Kauffman et al. | 702/182 |
| 2005/0278580 A1* | 12/2005 | Breitling et al. | 714/39 |
| 2005/0278587 A1* | 12/2005 | Breitling et al. | 714/48 |
| 2006/0111921 A1* | 5/2006 | Chang et al. | 705/1 |
| 2007/0067452 A1* | 3/2007 | Fung et al. | 709/224 |
| 2008/0071595 A1* | 3/2008 | Chang et al. | 705/7 |
| 2008/0098025 A1* | 4/2008 | Vadlamani et al. | 707/102 |
| 2009/0012836 A1* | 1/2009 | Weissbach et al. | 705/9 |
| 2011/0054987 A1* | 3/2011 | Nicolas et al. | 705/14.13 |
| 2011/0145086 A1* | 6/2011 | Valdes et al. | 705/26.1 |
| 2011/0191128 A1* | 8/2011 | Chao et al. | 705/7.11 |
| 2011/0191143 A1* | 8/2011 | Chao et al. | 705/7.36 |
| 2011/0191351 A1* | 8/2011 | Chao et al. | 707/748 |
| 2012/0089410 A1* | 4/2012 | Mikurak | 705/1.1 |
| 2012/0259722 A1* | 10/2012 | Mikurak | 705/26.1 |

OTHER PUBLICATIONS

Kapoor, S. et al., A technical framework for sense-and-respond business management IBM Systems Journal, vol. 44, No. 1, 2005.*

Cohen, Mitchell A. et al., Reducing Business Surprises through Proactice, Real-Time Sensing and Alert Management USENIX Association, EESR'05 Workshop on End-to-End, Sense-and-Respond Systems, Applications and Services, 2005.*

Viaene, Stijin et al., Corporeate Performance Management: Beyond Dashboards and Scorecards Journal of Performance Management, vol. 20, No. 1, 2007.*

Supply Chain Execution: Sense and Respond with an Adaptive Supply Chain Network SAP, May 2009.*

Haren, Claus, Exception Handling in Workflow Management Systems IEEE Transactions on Software Engineering, vol. 26, No. 10, Oct. 2000.*

Jeng, Jun-Jang et al., Policy Driven Business Performance Management DSOM 2004.*

Eckerson, Wayne W., Performance Dashboards: Measuing, Monitoring and Managing Your Business The Data Warehouse Institutue (TDWI), 2006.*

Verma, Kunal et al., Autonomic Web Processes Proceedings of the Third International Conference on Service Oriented Computed, ICSOC, 2005.*

Using Business Activity Monitoring ES Dashboard—Adobe LiveCycle ES, Version 8.0 Adobe, Jul. 2007.*

Eder, Johann et al., Workflow Recovery IFCIS Conference on Cooperative Systems, 1996.*

IBM Filenet Version 5.0—Process Tracker—Help Pages IBM, Nov. 2010.*

* cited by examiner

ENTERPRISE WIDE VALUE CHAIN MANAGEMENT SYSTEM (EVCM) FOR TRACKING, ANALYZING AND IMPROVING ORGANIZATIONAL VALUE CHAIN PERFORMANCE AND DISRUPTIONS UTILIZING CORRECTIVE ACTIONS

CROSS-REFERENCE TO RELATED APPLICATIONS

The present application claims priority to the foreign application having serial number 1665/CHE/2011 filed on May 16, 2011, and that application is incorporated in its entirety at least by reference.

BACKGROUND

1. Technical Field

The embodiments herein generally relate to an enterprise-wide value control and particularly to an enterprise-wide real-time system for tracking and measuring the value generated or consumed within an operating environment of an enterprise. The embodiments herein more particularly relates to a system for effective enterprise view, thereby helping in controlling optimal value flow across the enterprise.

2. Description of the Related Art

Today, the enterprise does a lot of activities or events or transactions, both externally and internally within the organization to exist. The total cost which an enterprise spends is split across all these activities. Similarly the revenue which an enterprise generates is also split across different regions, different lines of business, products, services and so on. The success of any business organization will revolve around the optimum generation of business value around their operations.

As organizations are becoming more global and more virtual, the need to control their operations in different geographies and diverse business lines from a centralized location becomes essential for an efficient management control. Enterprise-wide systems attain manifold importance in such conditions, when compared to the erstwhile silo-type of system architecture. Industry verticals are attending more to the needs of the customer, shifting focus from the traditional supply-driven operational model. Industry players are looking for customer-centricity, being increasingly aware of customer demands, and receptive and responsive to the customers—by providing the best value products and services to them. The success of any enterprise will depend on how best it can streamline and optimize its value flow to meet customer and market demands.

In the context of an enterprise, energy distribution in the body is akin to the flow of money through the various entities that form the enterprise. But on a broader perspective, money is not the only value generated in business. Value can be defined as a positive change in the qualitative and quantitative assets of an enterprise and the change can either be tangible or intangible. Among such positive changes, a monetary value can be measured and monitored on a real-time basis. This includes direct values like usage charges from customers and revenues from a department, or indirect values like opportunity cost and extent of risk mitigation. A value is generated and consumed through various activities/transactions/events occurring within an enterprise. Any enterprise comprises of several basic internal and external entities, which make up its operating environment. These entities include customers, internal departments producing and selling various products and services, external suppliers, channel partners, business processes and IT systems supporting the core functions of the organization. Value is generated and consumed when these entities interact with each other and perform activities/transactions/events.

However, in reality, the value flow is not smooth every time. When a value consumption is more than a value generation at any point of an enterprise, it leads to a value disruption or a value leakage. A disruption in the value flow is reflected on the organization as a revenue leakage, a customer aspiration gap, unprofitable products and package plans, non-productive partners, customer attrition, etc. When the various reasons behind a value loss or disruption in a value flow are analyzed, one of the key reasons is the delay in taking right management decisions or enforcing policies. On the other hand, the management requires real-time information on the generation/consumption of value as well as some intelligent platform to analyze the value flow and alert them on a possible value flow disruption, to effect those changes. A comprehensive system that can measure and monitor the creation, consumption and flow of value in an enterprise assumes pertinence for an effective management control. The management must be able to track the value enhancers, which could vary the magnitude of generation and consumption of value. For example, a 1$ increase in revenue could lead to 5 times an increase in the value of the firm, however, the same increase in the profit margins could lead to 20 times an increase in the value of the firm.

Thus there exists a need for a system and a method to track the different value enhancers, value generation and value consumption across an enterprise by tracking activities, transactions or events related to the enterprise.

SUMMARY

The embodiments herein provide an Enterprise-wide Value Chain Management system (EVCM) for computing/measuring the value generated or consumed by any entity within an operating environment of an enterprise as well as for controlling the flow by triggering suitable corrective actions. The EVCM system comprises the internal and external interface units, a value computation unit, a value measurement unit, a monitoring, reporting and dashboard unit as well as a value optimization unit comprising triggering unit and action engines for flow corrections. The value computation unit interacts with a plurality of entities in an organization through the interface units to monitor the activities occurred between the pluralities of entities in real time to compute a value generated through the activities occurred between the pluralities of entities. The value measurement unit is coupled to the value computation unit to process and monitor a flow of the measured values across the organization to detect a value generation, a value absorption and consumption and a value leakage at any point in the enterprise. The monitoring, reporting and dashboard units are connected to the value measurement unit to present an output of the value flow analysis to the management for monitoring the performance of the organization at a process level, entity level and policy level.

The embodiments disclosed herein provides for effective decision making for better business control, practical organizational plans and for effective enterprise view.

The embodiments disclosed herein also provides for effective analytical decision making including customer usage patterns, profitability for product/department, high value and low value customer relationships and performance of sales channel. Also the embodiments provides for effective decision making in the areas of product bundling and pricing, customer segmentation, billing, costing, settlements, risk exposure computation, receivables/payables.

The embodiments disclosed herein manage multiple operational platforms and resources involved in service provisioning. The embodiments features a full-fledged self-care portal, which helps external entities to establish activities/transactions/events like customer registration, availing products and services, payment of bills and complaints registration, etc., with the organization without any 'physical' contact, through the web interface In one embodiment disclosed herein, the entities include external entities and internal entities. The external entities include a plurality of customers, partners, regulatory bodies and external systems whereas the internal entities include a plurality of departments in the organization, a process environment and internal systems.

The activity includes a transaction or an event. The interface unit includes an external entity interface layer and an internal entity interface layer. The external interface layer includes a first real time data integration module, an event normalization unit that can make sure that all incoming transaction/event data is fed to the value computation system in a consistent format and generates output information also in desired formats for downstream systems, a service provisioning module, a self care interface module, a customer profile and hierarchy management module and a partner management module. The first real time data integration module has a rule based data integration engine to collect a data related to the activities originating from or terminating with the external entities and to detect a type of the pluralities of activities in multiple formats from the external entities to validate and interpret the detected types of the pluralities of activities in a desired format for determining a value created in the activity, wherein the service provisioning module manages a plurality of service requests and provisioning so that the service provisioning module manages multiple platforms and resources involved in a service provisioning process in real time and on-demand. The self care interface module is provided to enable the external entities to establish the pluralities of activities with the organization in online without any physical contact. The customer profile and hierarchy management module collects a customer profile from a customer-facing applications or systems, maintains all the customer profiles and stores the customer relationships in a hierarchical manner and acts as an interface to any customer front-end application thereby updating any customer or account-related data mutually in a knowledge base provided within the value flow analysis unit. The partner management module acquires a partner profile, revenue sharing agreements and contractual details required for defining, executing and reconciling settlement models with the partners and define a horizontal value chain and a vertical value chain to identify all the partners associated with the organization for an existence in a business environment.

The internal entity interface layer includes a product catalogue module, a second real time data integration module, an event normalization unit that can make sure that all incoming transaction/event data is fed to the value computation system in a consistent format and generates output information also in desired formats for downstream systems and a workflow management module. The product catalogue module manages pluralities of products from the plurality of departments and creates a product hierarchy to link main products, sub-products and accessory services to generate a catalogue of products for the customers to choose a desired product or a product package. The products include both base products and product packages.

The second real time data integration module has a rule based data integration engine to collect a data related to activities originating from or terminating with the external entities and to detect a type of the plurality of activities in multiple formats from the external entities to validate and interpret the detected types of the plurality of activities in a desired format for determining a value created in the activity.

The workflow management module is provided to regulate an internal workflow required to process a plurality of service requests, to define a workflow, to create a project to manage the defined workflow and to perform resource allocation, escalation, re-routing and status monitoring functions.

The service requests include a new service demand, customer complaints and inter-departmental process requests.

The value computation unit includes a costing module, a transfer pricing module, a charging module, a revenue share computing module, a billing module, a risk exposure computation module and a receivable and payable management module.

The costing module computes a cost for an activity or a process or a resource and configures rules to set costs to a plurality of components that make up the activity or process.

The transfer pricing module is provided to estimate a price of a product or service, which is sold or rendered within the organization, thereby determining a value of a product or service or activity or process, which is transferred from one division to another division within the organization to enable the organization to control a value transfer process and a value leakage between a plurality of divisions.

The charging module computes a value of a product usage or a customer interaction by executing a business rule-driven value computation process based on a context, content, extent of interaction and actors involved. The charging module supports a plurality of multiple pricing computation models both in online and offline modes.

The revenue share computing module calculates a value shared between a plurality of departments and entities.

The billing module aggregates one-time, recurring and usage charges to be paid by the customer or partner over a period of time, provides discounts and financial incentives to the customers and channel partners based on the total value brought by the customers and channel partners to the organization, and imposes penalties on the entities that disrupt a value creation within the organization.

The risk exposure computation module measures an extent of risk involved in any internal entity or external entity to judge a potential of a risk generated across the organization by scanning a value creation/consumption activity and forwards the measured risk to the value flow analysis unit.

The risk includes a default in payment or account by a customer, abnormal usage by a customer, a deficit in target sales assigned to a partner and a loss generated in operations by an internal department.

The risk exposure computation module creates rules that are required for measuring a risk and forwards the created rules to a business rule database to estimate a potential of risk generated across the organization during a scanning of a value creation/consumption activity.

The receivable and payable management module tracks all payables and receivables of the organization, tracks and measures inflows and outflows of all values to arrive at a net value creation or consumption within the organization and supports all modes and channels of payment, as well as low value and high value payments.

The value measurement unit includes a customer relationship tracking module, a profitability analysis module, a revenue analysis module, a simulation engine, a threshold management module, a partner performance analysis module and a knowledge data base.

The customer relationship tracking module analyzes a relationship of the organization with the customers to identify high value customers and low value customers and tracks a customer relationship value across a plurality of products, services, accounts, regions based on pre-defined attributes set by a management to gain a single view of the customer as a whole entity to design personalized products, pricing plans and post-sales servicing.

The profitability analysis module analyzes a flow of values created due to an activity to estimate a profitability of the pluralities of entities and business operations, by comparing a total cost of the activity with the value created due to the activity to identify the activities yielding profit and wherein the total cost of the activity is obtained by aggregating a cost of each activity between each customer and organisation over a given period.

The revenue analysis module calculates revenue from the plurality activities and entities to estimate revenue per customer or per partner or per network route at a plurality of stages to compute a value created in terms of revenue across the organization to identify a revenue leakage point in the organization.

The simulation engine is provided to simulate a given scenario to predict an impact of changes in business rules on value creation or consumption to enable the management to assess the impact before committing to any such changes in management policies and to test a feasibility of new products, pricing plans and processes by predicting and comparing an expected value with a corresponding cost elements.

The threshold management module is provided to set threshold limits for each of a plurality of critical operational attributes and to compare the measured value created or consumed in each activity with the set threshold limit to detect instances, in which the set threshold value is crossed, to send alarms and reports to the monitoring and reporting unit to discontinue the services offered to a prepaid customer. This module combines with the triggering unit in the value optimization component to generate triggers and alarms.

The plurality of critical operational attributes includes risk exposure of a customer, payment dues from a partner, margins from a product sale and minimum sales achieved by a channel partner.

The partner performance analysis module analyzes a performance of the channel partners based on the total value generated for the organization and evaluates the performance of the channel partners in providing the services to the customers by tracking sales volume and Quality of Service (QoS) levels to estimate an effectiveness of the channel partners to identify a high performance partner and a low performance partner.

The knowledge data base is provided to store the identified revenue leakage points for refining the business rules in the value measurement unit to reduce a possibility of revenue leakage and to increase an efficiency of a value creation process.

The monitoring and reporting unit includes a management dashboard module and a reporting and alerting module.

The management dashboard module is provided to monitor a performance of a business at a process level, an entity level and policy level to identify a value generation point, a value absorption point, a value consumption point and a value leakage point to provide a cockpit view of an entire value accumulation within the organization and to provide a support for a plurality of strategic exercises. The management dashboard module monitors the performance of the business at the process level to identify a transaction metrics. The management dashboard module monitors the performance of the business at the entity level to identify a customer metrics, a product metrics and a partner metrics. The management dashboard module monitors the performance of the business at the policy level to identify a pricing plan and a product launch with respect to a customer segment.

According to one embodiment, the plurality of strategic exercises include identification of customer segmentation and usage patterns for designing promotional campaigns, designing and redesigning of product and service packaging, designing and redesigning of a pricing structure, a partner settlement framework and partner reviews, a customer relationship management and retention plans, a revenue estimation and budgeting process, and a regulatory compliance and reporting process.

The reporting module is provided to generate a plurality of reports and alerts in both reactive and proactive modes, and in standard and customized formats periodically as well as instantaneously.

According to an embodiment herein, the system has a value optimization component consisting of triggering unit and action engines. The value flow analysis is done in the value measurement unit to generate triggers, which are fed to the triggering unit. Triggering unit is fed with rules to determine the corrective actions to be followed for improving or optimizing the value flow and then can trigger an appropriate or correct or respective action engine depending on the context and involved entities in the value exchange.

According to an embodiment herein, a plurality of actions engines could be provided depending on the type of value exchange, entities involved, event type and so on. For example if there is an unprofitable product, then the triggering unit alerts the reporting unit to generate and forward the product profitability reports to the product managers.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments disclosed herein will be better understood from the following detailed description with reference to the drawings, in which.

DETAILED DESCRIPTION OF PREFERRED EMBODIMENTS

The embodiments disclosed herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments disclosed herein. The examples used herein are intended merely to facilitate an understanding of ways in which the embodiments disclosed herein may be practiced and to further enable those of skill in the art to practice the embodiments disclosed herein. Accordingly, the examples should not be construed as limiting the scope of the embodiments disclosed herein.

The embodiments herein disclose an Enterprise-wide Value Chain Management (EVCM) system for monitoring enterprise-wide value distribution for performing a value flow analysis to help the management in real-time decision making The term 'value' actually refers to the generation and consumption of money with in an enterprise.

Figure 1:
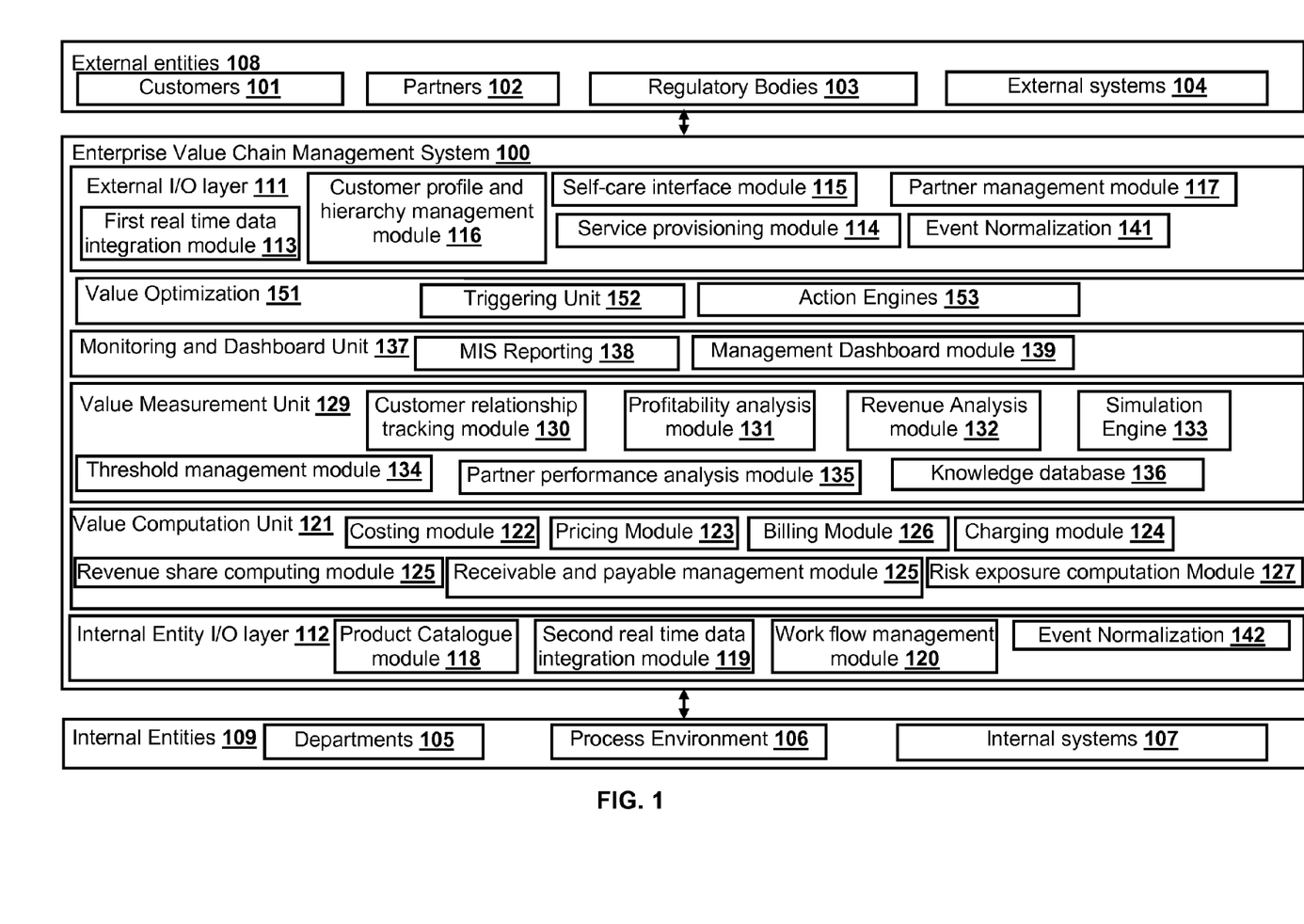
FIG. 1 illustrates a detailed functional block diagram of an Enterprise-wide Value Chain Management (EVCM) System, in accordance with an embodiment disclosed herein.
Figure 2:
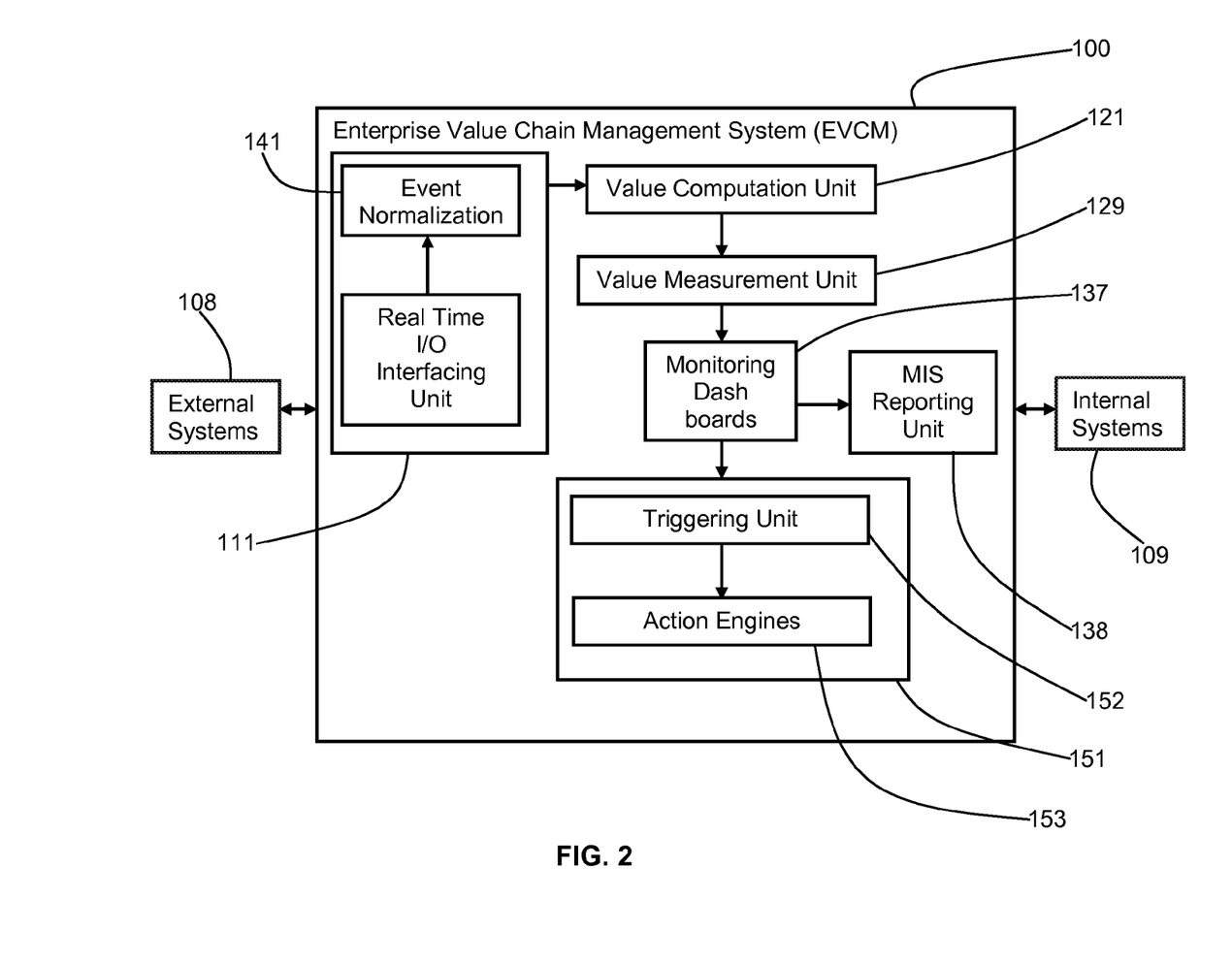
FIG. 2 illustrates a schematic block diagram of an Enterprise-wide Value Chain Management (EVCM) system in accordance with an embodiment disclosed herein.

Referring now to the drawings, and more particularly to FIGS. 1 and 2, where similar reference characters denote corresponding features consistently throughout the figures, there are shown as preferred embodiments.

The embodiments herein disclose a real-time system to compute/measure generation of value in any segment of business activity, based on the context, content, extent and actors. The EVCM system 100, according to the present disclosure, monitors activities/transactions/events between different entities both external and internal that are part of the business value chain in real-time, measures/computes the value generated in the activities/transactions/events, tracks the value consumed, analyzes end-to-end value flow, performs proactive management reporting and updates the knowledge base and the business rule base on a continuous basis or at pre-set intervals. System also would initiate value flow correction steps either internally or with external systems as well. The system includes multiple functional components, designed to operate in both standalone and integrated modes, performing functions relating to value computation and measurement, flow monitoring, analysis and reporting on real-time basis. The system is self-managed, intelligent and scalable enough to operate in any business environment across any industry vertical and continuously update the knowledge base, which in turn helps the management to take preventive and corrective steps to optimize value generation/consumption within the organization's business ecosystem.

FIG. 1 illustrates a detailed functional block diagram depicting various modules of an Enterprise-wide Value Chain Management (EVCM), in accordance with the embodiments disclosed herein. EVCM system 100 is a real-time system that can help compute/measure generation of value in any segment of business activity, based on the context, content, extent and actors. The value is generated through the activities/transactions/events between the various entities. The EVCM system includes external and internal value chains depending on the entities involved in the flow of value. The external value chain links customers, suppliers and channel partners with the organization and the internal value chain comprises of various departments, business process units and support system environment.

The EVCM system 100 is split into several application units with a set of modules embedded in each unit as shown in FIG. 1. The customers 101, partners 102, regulatory bodies 103 and external systems 104 necessary for the core operations of the organization forms the external entities 108 acting upon an organization. A customer 101 is the prime external entity that creates a value for an organization. The partner 102 is the second prime external entity which creates value. Value comes in the form of new customers, new array of products, new markets, sales channels, etc., which in turn, translates to new revenue streams. The external systems 104 include networks, payment gateways, and the like.

The internal entities 109 that reside within the organization include the various departments 105, process environment 106 and other internal systems 107 supporting the core operations of the organization. The internal systems 107 include CRM, ERP, accounting systems and so on. The internal entities 109 brings value to the table in terms of swift roll-out of new products, high quality of services, efficient processing, fast response to customer demands and transparent revenue sharing arrangements with partners.

The Enterprise-wide Value Chain Management (EVCM) system 100 according to an embodiment herein comprises an interface unit, value computation unit 121 and a value measurement unit 129 to interact with a pluralities of entities in an organization through the interface unit to monitor an activity occurred between the pluralities of entities on real time to measure a value generated through the activity occurred between the pluralities of entities. A measurement unit 129 is coupled to the value computation unit 121 to process and monitor the flow of the measured values across the organization to detect a value generation point, a value absorption point, a value consumption point and a value leakage point. The system further comprises a monitoring and dashboard unit 137 connected to the value measurement unit 129 to receive and report an output of the value flow analysis unit 129 to the management to monitor the performance of the organization at a process level, entity level and policy level.

The interface unit 110 includes an external entity interface layer 111 and an internal entity interface layer 112. The external interface layer 111 includes a first real time data integration module 113, a service provisioning module 114, a self care interface module 115, a customer profile and hierarchy management module 116, a partner management module 117 and an event normalization unit 141. The first real time data integration module 113 has a rule based data integration engine to collect a data related to the activities originating from or terminating with the external entities. The data intergration engine further detects the type of the pluralities of activities in multiple formats from the external entities to validate and interpret the detected types of the pluralities of activities in a desired format for determining a value created in the activity. The service provisioning module 114 manages a plurality of service requests and provisioning so that the service provisioning module manages multiple platforms and resources involved in a service provisioning process in real time and on-demand. The self care interface module 115 enables the external entities to establish the pluralities of activities with the organization in online without any physical contact. For example, customers can register, avail products and services, view their usage details, pay their bills and raise complaints through the web interface. The self care interface module 115 is also relevant for online B2B activities/transactions/events like e-commerce.

The customer profile and hierarchy management module 116 collects a customer profile from the customer-facing applications or systems, maintains all the customer profiles and stores the customer relationships in a hierarchical manner. The customer profile and hierarchy management module 116 acts as an interface to any customer front-end application thereby updating any customer or account-related data mutually in a knowledge base provided within the value flow analysis unit. The partner management module 117 captures partner profiles, revenue sharing agreements and contractual details required for defining, executing and reconciling settlement models with the partners. The partner management module 117 also defines a horizontal value chain and a vertical value chain to identify all the partners associated with the organization for an existence in a business environment. The event normalization module 141 is provided to normalize all event records to a uniform format for further I/O processing, this would include steps such as format conversion and translation, duplicate record checking, editing of event records for data completeness and so on.

The internal entity interface layer 112 includes a product catalogue module 118, a second real time data integration module 119, a workflow management module 120 and an event normalization unit 142. The product catalogue module 118 manages pluralities of products from the plurality of departments and creates a product hierarchy to link main products, sub-products and accessory services to generate a catalogue of products for the customers to choose a desired product or a product package. The products include both base products and product packages. The second real time data integration module 119 has a rule based data integration engine to collect a data related to activities originating from or terminating with the external entities and to detect a type of the plurality of activities in multiple formats from the external entities to validate and interpret the detected types of the plurality of activities in a desired format for determining a value created in the activity. The workflow management module 120 is provided to regulate an internal workflow required to process a plurality of service requests, to define a workflow, to create a project to manage the defined workflow and to perform resource allocation, escalation, re-routing and status monitoring functions. For example, the plurality of service requests includes a new service demand, customer complaints and inter-departmental process requests. The event normalization module 141 is provided to normalize all event records to a uniform format for further I/O processing, this would include steps such as format conversion and translation, duplicate record checking, editing of event records for data completeness and so on.

The value computation unit 121 includes a costing module 122, a transfer pricing module 123, a charging module 124, a revenue share computing module 125, a billing module 126, a risk exposure computation module 127 and a receivable and payable management module 128. The costing module 122 computes the cost for an activity or a process or a resource and configures rules to set costs to a plurality of components that make up the activity or process. After computing, the total cost is compared to the value (revenue or profitability or new customer win) created as a result of a particular activity or process. The cost of each customer-organization interaction, when aggregated, gives the total cost of serving a customer over a period. This aids to map the total cost against the revenue that the customer brings to the enterprise.

The transfer pricing module 123 is provided to estimate a price of a product or service, which is sold or rendered within the organization, thereby determining a value of a product or service or activity or process, which is transferred from one division to another division within the organization. This enables the organization to control a value transfer process and a value leakage between plurality of divisions. The charging module 124 computes a value of a product usage or a customer interaction by executing a business rule-driven value computation process based on a context, content, extent of interaction and actors involved. The charging module 124 supports a plurality of multiple pricing computation models both in online and offline modes. The revenue share computing module 125 calculates a value shared between a plurality of departments and entities such as partners.

The billing module 126 aggregates one-time, recurring and usage charges to be paid by the customer or partner over a period of time, provides discounts and financial incentives to the customers and channel partners based on the total value brought by the customers and channel partners to the organization, and imposes penalties on the entities that disrupt a value creation within the organization. The risk exposure computation module 127 measures an extent of risk involved in any internal entity or external entity to judge a potential of a risk generated across the organization by scanning a value creation/consumption activity and forwards the measured risk to the value flow analysis unit. The risk includes a default in payment or account by a customer, abnormal usage by a customer, a deficit in target sales assigned to a partner and a loss generated in operations by an internal department. The risk exposure computation module 127 creates rules that are required for measuring a risk and forwards the created rules to a business rule database to estimate a potential of risk generated across the organization during a scanning of a value creation/consumption activity.

The receivable and payable management module 128 tracks all payables and receivables of the organization, tracks and measures inflows and outflows of all values to arrive at a net value creation or consumption within the organization. The receivable and payable management module 128 supports all modes and channels of payment, as well as low value and high value payments.

Once the value creation is measured, the EVCM 100 monitors the value flow across the enterprise to track absorption and consumption of value at various points in an organization's operating structure. For example, once a department manufactures a product, it needs to be delivered to the market. Entities like the marketing department, sales division and channel partners come into the picture at this point. When their activities/transactions/events with the product department and the end customers become effective, the products start moving to the market. Here, the value generated by a department in creating a high quality product gets consumed by other entities to enhance the total value of the organization in terms of adding new customers and increase in sales revenue. In this process, some entities may utilize that value to accumulate more value for the organization, say a channel partner 'X' sells the product to a large customer base, compared to another channel partner 'Y' or the internal sales organization. The EVCM system 100 helps to monitor this value accumulation and maps the value generated vs. value consumed by each entity across the organization. The EVCM system also monitors the value flow for identifying/predicting the points where value leakage occurs.

The value measurement unit 129 includes a customer relationship tracking module 130, a profitability analysis module 131, a revenue analysis module 132, a simulation engine 133, a threshold management module 134, a partner performance analysis module 135 and a knowledge database 136. The customer relationship tracking module 130 analyzes a relationship of the organization with the customers. This module identifies high value customers and low value customers and tracks a customer relationship value across a plurality of products, services, accounts, regions based on pre-defined attributes set by a management to gain a single view of the customer as a whole entity to design personalized products, pricing plans and post-sales servicing.

The profitability analysis module 131 analyzes a flow of values created due to an activity to estimate a profitability of the pluralities of entities and business operations. The profitability of the pluralities of entities and business operations is estimated by comparing a total cost of the activity with the value created due to the activity to identify the activities yielding profit. The total cost of the activity is obtained by aggregating the cost of each activity between each customer and organisation over a given period. The revenue analysis module 132 calculates revenue from the plurality of activities and entities to estimate revenue per customer or per partner or per network route at a plurality of stages to compute a value created in terms of revenue across the organization to identify a revenue leakage point in the organization. The simulation engine 133 is provided to simulate a given scenario to predict the impact of changes in business rules on value creation or consumption. This enables the management to assess the impact before committing to any such changes in management policies and to test a feasibility of new products, pricing plans and processes by predicting and comparing an expected value with the corresponding cost elements. The threshold management module 134 is provided to set threshold limits for each of a plurality of critical operational attributes and to compare the measured value created or consumed in each activity with the set threshold limit to detect instances, in which the set threshold value is crossed, to send alarms and reports to the monitoring and reporting unit to discontinue the services offered to a prepaid customer. The plurality of critical operational attributes includes risk exposure of a customer, payment dues from a partner, margins from a product sale and minimum sales achieved by a channel partner.

The partner performance analysis module 135 analyzes the performance of the channel partners based on the total value generated for the organization and evaluates the performance of the channel partners in providing the services to the customers by tracking sales volume and Quality of Service (QoS) levels to estimate an effectiveness of the channel partners. The partner performance analysis module 135 identifies a high performance partner and a low performance partner. The knowledge database 136 is provided to store the identified revenue leakage points for refining the business rules in the value measurement unit to reduce a possibility of revenue leakage and to increase an efficiency of a value creation process.

The monitoring and reporting unit 137 includes a management dashboard module 139 and a reporting and alerting module 138. The management dashboard module 139 monitors the performance of a business at a process level, an entity level and policy level to identify a value generation point, a value absorption point, a value consumption point and a value leakage point to provide a cockpit view of an entire value accumulation within the organization and to provide a support for a plurality of strategic exercises. The management dashboard module 139 monitors the performance of the business at the process level to identify a transaction metrics, at the entity level to identify a customer metrics, a product metrics and a partner metrics and at the policy level to identify a pricing plan and a product launch with respect to a customer segment. The plurality of strategic exercises include identification of customer segmentation and usage patterns for designing promotional campaigns, designing and redesigning of product and service packaging, designing and redesigning of a pricing structure, a partner settlement framework and partner reviews, a customer relationship management and retention plans, a revenue estimation and budgeting process and a regulatory compliance and reporting process.

The alerting and reporting module 138 is provided to generate a plurality of reports and alerts in both reactive and proactive modes. For example, once the total value accumulated by a customer goes down the cost of serving him, a report can be instantaneously generated to alert the Relationship Manager concerned, to urge him to take necessary steps. The reporting and alerting module 138 also creates standard and customized formats periodically as well as instantaneously.

Once the EVCM system measures value flow and show in a dashboard, a value optimization unit 151 ensures that value flow disruptions are tracked and trigger right corrective actions by interfacing with various internal and external entities. For example if the EVCM system detects that a product is unprofitable, and then it needs to alert the pricing system to come up with a new plan to ensure product profitability. Value optimization unit is provided with a triggering unit 152 and necessary action engines 153 to process those value flow corrective actions and decisions. The Triggering Unit 152 is provided to trigger necessary actions so as to correct the value flow across the enterprise. This could be in the form of alarms or simple commands to other business systems and networks which can trigger off a sequence of actions by interfacing with internal and external entities to correct or optimize the value flow. The Action Engines 153 includes a set of action engines that are available to configure business logic to correct or optimize the value flow in a given context. The specific action engine can be triggered depending on the context and entities involved in the value exchange.

The EVCM system 100 achieves continuous intelligence build-up process with real-time feeding in between the operational unit and the analytical unit within the system 100. The value computation unit 121 performs functions like pricing, costing, billing, settlement, etc. generates a lot of information on value generation and consumption. The information is fed to the knowledge database 136. The analytical functional modules in the value measurement unit 129 like profitability analysis module 131, revenue analysis module 132, etc., as well as the simulation engine 133 take data from the knowledge database 136 to generate management reports, alerts, etc. on value generation, consumption and disruption patterns. The simulation engine 133 helps the management to review the performance reports and then refine the business rules based on this knowledge-based analysis and learning. These refined business rules will in turn, make the operational platforms more efficient. The continuous learning and business rule enhancement enables to make the EVCM system 100 self-supported and adaptable to dynamic business environments, better than the conventional intelligence platforms, which are disparate from the operational platforms.

Enterprise value measurement and monitoring platform can be deployed on a licensing as well as hosted mode. When operating in hosted mode, when an enterprise connects online, the platform will start interfacing with the various operational platforms with in the enterprise to log in value generation/consumption activities, measure the value and monitors the value flow across the enterprise.

The EVCM has different stand-alone functional components integrated into one platform. Though most of the modules exist as software products, the functional capability of these modules are redefined from the value chain management perspective and are made generic to fit into any industry vertical.

FIG. 2 illustrates a schematic block diagram of an Enterprise-wide Value Chain management (EVCM) system in accordance with an embodiment disclosed herein. With respect to FIG. 2, the external systems 104 include networks, payment gateways, and the like. The internal systems 107 include CRM, ERP, accounting systems and so on. The Enterprise-wide Value Chain Management system (EVCM) 100 according to an embodiment herein comprises a real time interfacing unit 110 and an event normalization unit 141. The event normalization unit is connected to the interface unit 110 to normalize all event records to a uniform format for further I/O processing. This would include steps such as format conversion and translation, duplicate record checking, editing of event records for data completeness and so on.

A value measurement unit 129 to interact with a pluralities of entities in an organization through the interface unit 110 and value computation unit 121 to monitor an activity occurred between the pluralities of entities on real time to measure a value generated through the activity occurred between the pluralities of entities. A value measurement unit 129 is coupled to the value computation unit 131 to process and monitor the flow of the measured values across the organization to detect a value generation point, a value absorption point, a value consumption point and a value leakage point. The system further comprises a monitoring and dashboard unit 137 connected to the value flow analysis unit to receive and report an output of the value flow analysis unit to the management to monitor the performance of the organization at a process level, entity level and policy level.

The monitoring and dashboard unit 137 includes a management dashboard module 139 and a reporting and alerting module 138. The management dashboard module 139 monitors the performance of a business at a process level, an entity level and policy level to identify a value generation point, a value absorption point, a value consumption point and a value leakage point to provide a cockpit view of an entire value accumulation within the organization and to provide a support for a plurality of strategic exercises. The management dashboard module 139 monitors the performance of the business at the process level to identify a transaction metrics, at the entity level to identify a customer metrics, a product metrics and a partner metrics and at the policy level to identify a pricing plan and a product launch with respect to a customer segment. The plurality of strategic exercises include identification of customer segmentation and usage patterns for designing promotional campaigns, designing and redesigning of product and service packaging, designing and redesigning of a pricing structure, a partner settlement framework and partner reviews, a customer relationship management and retention plans, a revenue estimation and budgeting process and a regulatory compliance and reporting process. The monitoring and dashboard unit 137 is connected to the value optimization unit 151 provided with a triggering unit 152 and action engines 153.

Once the EVCM system measures value flow and show in a dashboard, a value optimization unit 151 ensures that value flow disruptions are tracked and trigger right corrective actions by interfacing with various internal and external entities. For example if the EVCM system detects that a product is unprofitable, and then it needs to alert the pricing system to come up with a new plan to ensure product profitability. Value optimization unit 151 has a triggering unit 152 and necessary action engines 153 to process those value flow corrective actions and decisions. The Triggering Unit 152 is provided to trigger necessary actions so as to correct the value flow across the enterprise. This could be in the form of alarms or simple commands to other business systems and networks which can trigger off a sequence of actions by interfacing with internal and external entities to correct or optimize the value flow. The Action Engines 153 includes a set of action engines that are available to configure a business logic to correct or optimize the value flow in a given context. The specific action engine can be triggered depending on the context and entities involved in the value exchange.

The alerting and reporting module 138 is provided to generate a plurality of reports and alerts in both reactive and proactive modes. For example, once the total value accumulated by a customer goes down the cost of serving him, a report can be instantaneously generated to alert the Relationship Manager concerned, to urge him to take necessary steps. The reporting and alerting module 138 also creates standard and customized formats periodically as well as instantaneously.

The embodiments disclosed herein provides for effective decision making for better business control, practical organizational plans and for effective enterprise view.

The embodiments disclosed herein also provides for effective analytical decision making including customer usage patterns, profitability for product/department, high value and low value customer relationships and performance of sales channel. Also the embodiments herein provides for effective decision making in the areas of product bundling and pricing, customer segmentation, billing, costing, settlements, risk exposure computation, receivables/payables.

The embodiments disclosed herein manage multiple operational platforms and resources involved in service provisioning. The embodiments herein features a full-fledged self-care portal, which helps external entities to establish activities/transactions/events like customer registration, availing products and services, payment of bills and complaints registration, etc., with the organization without any 'physical' contact, through the web interface.

As can be appreciated, the embodiments disclosed herein allow real-time monitoring of transactions/activities, value flow analysis and proactive management reporting. Also it is to be understood that the disclosure herein is not limited to this precise embodiment and that various changes and modifications may be affected therein without departing from the original scope or spirit of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An Enterprise Value Chain Management (EVCM) system comprising:
an interface unit, and wherein the interface unit includes an external entity interface layer and an internal entity interface layer, and wherein the external interface layer includes a first real time data integration module, an event normalization module, a service provisioning module, a self care interface module, profile and hierarchy, management module, a partner management module, and wherein the internal entity interface layer includes a product catalogue module, a second real time data and information integration module an event normalization module and a workflow management module;
a value computation unit to interact with a pluralities of entities in an organization through the interface unit to track an activity occurred between the pluralities of entities in real time to compute a value generated through the activity occurred between the pluralities of entities, and wherein the value computation unit includes a costing module, a transfer pricing module, a charging module, a revenue share computing module, a billing module, a risk exposure computation module and a receivable and payable module, and wherein the value is a new customer, new array of products, new markets, sales channels which are translated into new revenue streams, and wherein the value is a generation of consumption of money within an enterprise;

a value measurement unit coupled to the value computation unit to process and monitor a flow of the measured values across the organization to detect a value generation, a value absorption and a value consumption and a value leakage at any point in an entire value flow, and wherein the value measurement unit includes a customer relationship tracking module, a profitability analysis module, a revenue analysis module, a simulation engine, a threshold management module, a partner performance analysis module and knowledge data base;

wherein the profitability analysis module analysis a flow of values created due to an activity to estimate a profitability of the pluralities of entities and business operations, by comparing a total cost of the activity with the value created due to the activity to identify activities yielding profit and wherein the total cost of the activity is obtained by aggregating a cost of each activity between each customer and the organization over a given period of time;

wherein the simulation engine is provided with predictive plotting capability to simulate a given scenario to predict an impact in business rules on value creation or consumption to enable management to assess the impact before committing to changes in management policies and to test a feasibility of new products, pricing plans and processes by predicting and comparing an expected value with corresponding cost elements;

a monitoring and dashboard unit connected to the value measurement unit to receive and report an output of a value flow analysis unit to management to monitor performance of the organization from multiple levels of flow and transfer, wherein the multiple levels of flow includes a process level, an entity level, and a policy level and wherein monitoring and dashboard unit includes a management dashboard module and a reporting and alerting module; and a value optimization unit to ensure that value flow disruptions are tracked and trigger right corrective actions with the entities, and wherein the value optimization unit includes a triggering unit and a plurality of action engines to process a value flow to provide corrective actions and decisions.

2. The system according to claim 1, wherein the entities include external entities and internal entities.

3. The system according to claim 2, wherein the external entities include a plurality of customers, partners, regulatory bodies and external systems.

4. The system according to claim 2, wherein the internal entities include a plurality of departments in the organization, a process environment and internal systems.

5. The system according to claim 1, wherein the activity includes a transaction or an event and wherein a value exchange takes place in the activity.

6. The system according to claim 1, wherein the first real time data integration module has a rule based data integration engine to collect a data related to the activities or events or transactions originating from or terminating with the external entities as and when the activities or events or transactions occur.

7. The system according to the claim 6, wherein the rule based data integration engine detects any type of a pluralities of activities in multiple formats from the external entities in a hatch mode in real-time to validate and interpret the detected types of the pluralities of activities in a desired format for determining a value created in the activity.

8. The system according to the claim 1, wherein the event normalization module is connected, to the interface unit to normalize all event records to a uniform format for further I/O processing and wherein the event normalization module is provided to perform a format conversion and translation, a duplicate record checking, and editing of event records for data completeness operations.

9. The system according to claim 1, wherein the service provisioning module manages a plurality of service requests, provisioning on multiple platforms and scheduling resources involved in a service provisioning process in real time and on-demand.

10. The system according to claim 1, wherein the self care interface module is provided to enable the external entities to establish the pluralities of activities with the organization in an online mode or in an electronic format without any physical contact.

11. The system according to claim 1, wherein the customer profile and hierarchy management module collects a customer profile data and information from a customer-facing applications or systems, maintains all the customer profiles and stores the customer relationships in a hierarchical manner and acts as an interface to any customer front-end application thereby updating any customer or account-related data mutually and in real-time in the knowledge data base provided within the value flow analysis unit.

12. The system according to claim 1, wherein the partner management module acquires a partner profile, revenue sharing agreements and contractual details required for defining, executing and reconciling settlement models with the partners and defines a horizontal value chain and a vertical value chain to identify all the partners associated with the organization for an existence in a business environment.

13. The system according to claim 1, wherein the internal entity interface layer has a logic built in to pull in a data from multiple entities and sources as desired for measuring the value.

14. The system according to claim 1, wherein the product catalogue module manages a pluralities of products from the plurality of departments and creates a product hierarchy to link main products, sub-products and accessory services to generate a catalogue of products for the customers to choose a desired product or a product package and to envisage a plurality of channel interfaces to enable a customers to choose a product or package and subscribe to the product or package or change the plan or switch the package on the plurality of multiple channel interfaces and wherein the plurality of multiple channel interfaces includes online and mobile channels and wherein the products include both base products and product packages.

15. The system according to claim 1, wherein the second real time data integration module has a rule based data integration engine to collect a data related to the plurality of activities originating from or terminating with the internal entities in batches and in real-time to detect a type of the plurality of activities in multiple formats from the internal entities to validate and interpret the detected types of the plurality of activities in a desired format for determining a value created in the activity.

16. The system according to the claim 15, wherein the event normalization module is connected to the interface unit to normalize all event records to a uniform format for further I/O processing and wherein the event normalization module performs format conversion and translation, duplicate record checking and editing of event records for data completeness.

17. The system according to claim 1, wherein the workflow management module is provided to regulate an internal workflow required to process a plurality of service requests, to define a workflow, to create a project to manage the defined workflow and to perform resource allocation, escalation, re-routing and status monitoring functions.

18. The system according to claim 17, wherein the service requests include a new service demand, customer complaints and inter-departmental process requests.

19. The system according to claim 1, wherein the costing module computes a cost for an activity or a process or a resource and configures rules to set costs to a plurality of components that make up the activity or process and wherein the costing module includes a cost computation model to compute the cost for an activity.

20. The system according to claim 1, wherein the transfer pricing module is provided to estimate a price of a product or service, which is sold or rendered within the organization, thereby determining a value of a product or service or activity or process, which is transferred from one division to another division within the organization to enable the organization to control a value transfer process and a value leakage between a plurality of divisions to ensure that a transfer price determined for a product or a service covers a desired margin levels set by the management.

21. The system according to claim 1, wherein the charging module computes a value of a product usage or a customer interaction by executing a business, rule-driven value computation process based on a context, content, extent of interaction and actors involved, using a Charge computation logic and wherein the charge computation logic is configured by a business logic.

22. The system according to claim 1, wherein the charging module supports a plurality of multiple pricing computation models both in online and offline modes.

23. The system according to claim 1, wherein the revenue share computing module calculates a value shared between a plurality of departments and entities and reconciles the calculated value with a plurality of external and internal partners on any dispute.

24. The system according to claim 1, wherein the billing: module aggregates one-time, recurring and usage charges to be paid by the customer or partner over a period of time, provides discounts and financial incentives to the customers and channel partners based on a total value brought by the customers and channel partners to the organization and imposes penalties on the entities that disrupt a value creation within the organization.

25. The system according to claim 1, wherein the risk exposure computation module measures an extent of risk involved in any internal entity or external entity to judge a potential of a risk generated across the organization by scanning a value creation/consumption activity and forwards the measured risk to the value flow analysis unit.

26. The system according to claim 25, wherein the risk is estimated based on value computation and generation and wherein the risk includes a default in payment or account by a customer, abnormal usage by a customer, a deficit in target sales assigned to a partner and a loss generated in operations by an internal department.

27. The system according to claim 1, wherein the risk exposure computation module creates rules that are required for measuring a risk and forwards the created rules to a business rule database to estimate a potential of risk generated across the organization during a monitoring of any value creation/consumption activity.

28. The system according to claim 1, wherein the receivable and payable management module tracks all payables and receivables of the organization, tracks and measures inflows and outflows of all values to arrive at a net value creation or consumption within the organization and supports all modes and channels of payment, as well as low value and high value payments.

29. The system according to claim 1, the customer relationship tracking module analyzes a relationship of the organization with the customers to identify high value customers and low value customers and tracks a customer relationship value across a plurality of products, services, accounts, regions based on predefined attributes set by a management to gain a single View of the customer as a whole entity to design personalized products, pricing plans and post-sales servicing.

30. The system according to claim 1, wherein the revenue analysis module calculates revenue from the plurality activities and entities to estimate revenue per customer or per partner or per a measurable entity at a plurality of stages to compute a value created in terms of revenue across the organization to identify a revenue leakage point in the organization and wherein a measurable entity includes a network.

31. The system according to claim 1, wherein the threshold management module is provided to set threshold limits for each of a plurality of critical operational attributes and to compare the measured value created or consumed in each activity with the set threshold limit to detect instances in which the set threshold value is crossed, to send alarms and reports to the monitoring and reporting unit to discontinue the services offered to a prepaid customer.

32. The system according to claim 31, wherein the plurality of critical operational attributes includes risk exposure of a customer, payment dues from a partner, margins from a product sale and minimum sales achieved by a channel partner.

33. The system according to claim 1, wherein the partner performance analysis module analyzes a performance of the channel partners based on the total value generated for the organization and evaluates the performance of the channel partners in providing the services to the customers by tracking sales volume and Quality of Service (QoS) levels to estimate an effectiveness of the channel partners to identify a high performance partner and a low performance partner.

34. The system according to claim 1, wherein knowledge data base is provided to store the identified revenue leakage points for refining the business rules in the value measurement unit to reduce a possibility of revenue leakage and to increase an efficiency of a value creation process and to store a best practices in value measurement and monitoring methods and processes used by a plurality of departments and wherein the best practices are practices that yield a maximum gain.

35. The system according to claim 1, wherein the management dashboard module is provided to monitor a performance of a business at a process level, an entity level and policy level to identify a value generation point, a value absorption point, a value consumption point and a value leakage point to provide a cockpit view of an entire value accumulation within the organization and to provide a support for a plurality of strategic exercises.

36. The system according to claim 1, wherein the management dashboard module monitors the performance of the business at any process level to report the value generation/consumption/leakage at any process within the organization.

37. The system according to claim 1, wherein the management dashboard module monitors the performance of the business at the entity level to identify a customer metrics, a product metrics and a partner metrics.

38. The system according to claim 1, wherein the management dashboard module monitors the performance of the business at the policy level to identify a pricing plan and a product launch with respect to a customer segment.

39. The system according to claim 35, wherein the plurality of strategic exercises include identification of customer segmentation and usage patterns for designing promotional campaigns, designing and redesigning of product and service packaging, designing and redesigning of a pricing structure, a partner settlement framework and partner reviews, a customer relationship management and retention plans, a revenue estimation and budgeting process, and a regulatory compliance and reporting process.

40. The system according to claim 1, wherein the reporting and alerting module is provided to generate a plurality of reports and alerts in both reactive and proactive modes, and in standard and customized formats periodically as well as instantaneously.

41. The system according to claim 1, wherein the triggering unit is provided with rules to trigger necessary actions so as to correct the value flow across the enterprise to improve or optimize a value flow and wherein the triggering unit provides alarms or simple commands to other business systems and networks to trigger off a sequence of actions by interfacing with internal and external entities to correct or optimize the value flow.

42. The system according to claim 1, wherein the plurality of action engines are provided with a business logic to optimize Or correct a value flow in any given context and wherein an action engine is triggered based on a context and the entities involved in a value flow exchange.

* * * * *